W. G. PEUGH.
JACK FOR RAISING AUTOMOBILES AND OTHER VEHICLES.
APPLICATION FILED APR. 15, 1913.

1,108,000. Patented Aug. 18, 1914.

Witnesses
J. Milton Jester
C. Emmett

Inventor
William G. Peugh
By D. A. Gowrick
Attorney

UNITED STATES PATENT OFFICE.

WILLIAM G. PEUGH, OF ABERDEEN, MISSISSIPPI.

JACK FOR RAISING AUTOMOBILES AND OTHER VEHICLES.

1,108,000.  Specification of Letters Patent.  Patented Aug. 18, 1914.

Application filed April 15, 1913. Serial No. 761,330.

*To all whom it may concern:*

Be it known that I, WILLIAM G. PEUGH, a citizen of the United States, residing at Aberdeen, in the county of Monroe and State of Mississippi, have invented certain new and useful Improvements in Jacks for Raising Automobiles and other Vehicles, of which the following is a specification.

This invention relates to an automobile jack and particularly to a jack which is adapted to be operated by running the automobile upon it under its own power.

The object of the invention is to provide a device of this character which will elevate all four wheels of the car with one operation and which will lower the car to the floor by means of a lever.

An important object is to provide a device of this character having mounted thereon a bumper or shock absorber to stop the car in its elevated position without undue shock.

A further object is to provide a device of this character having rear elevating members of such construction that their top edges will not move angularly when the car is elevated.

Figure 1:
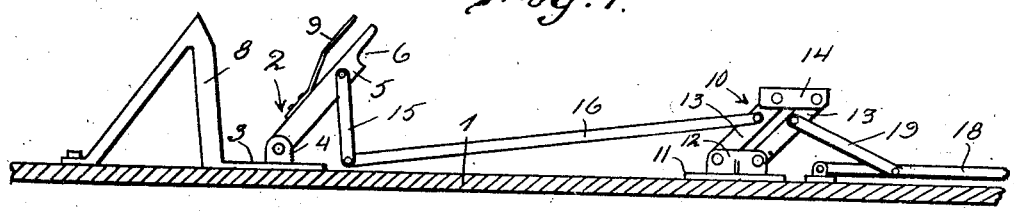
Figure 2:
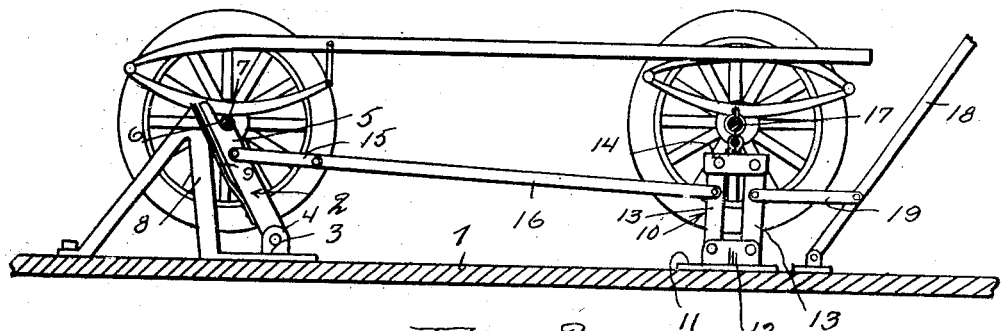
Figure 3:
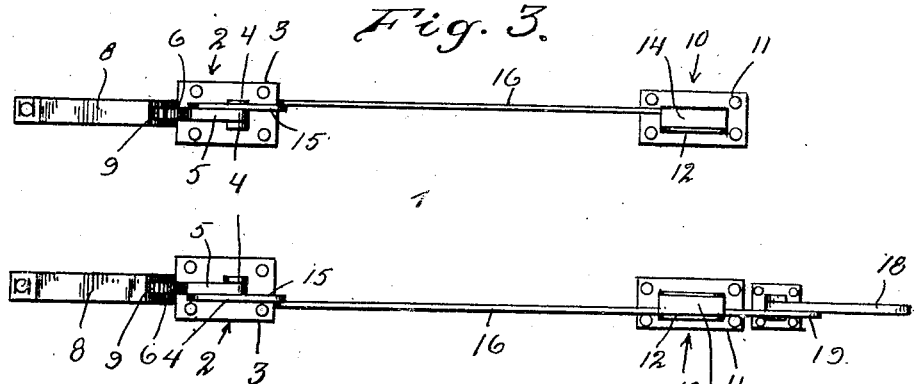
Figure 4:
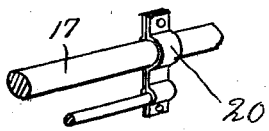

Other objects and advantages such as simplicity, durability, efficiency, and general improvement of the art will be brought out in the following specification and illustrated in the accompanying drawings, in which:

Figure 1 is a side elevation of the device in its initial or lowered position, Fig. 2 is a similar view showing the parts in their elevated position, Fig. 3 is a top plan view, and Fig. 4 is a detail view of the truss-shield.

Referring more particularly to the drawings the numeral 1 designates a base which may be the floor of a shop or garage or which may be portable. Secured upon the base 1 are forward elevating members 2 which comprise brackets 3 provided with upstanding ears 4 between which are pivoted levers 5 provided with recessed portions 6 adapted to be engaged by the front axle 7 of an automobile. Adjacent the brackets 3 are secured bumpers 8 adapted to be engaged by the levers 5 as shown in Fig. 2. Springs 9 are secured upon the faces of the levers 5 for preventing undue shock when the levers 5 are thrown against the bumpers 8. Spaced from the brackets 3 and in alinement therewith are rear elevating members 10 which comprise brackets 11 secured upon the base 1, and provided with up-standing ears 12 between which are pivoted pairs of levers 13 which are pivotally connected at their upper ends by shoes 14. Pivotally connected with the levers 5 are short links 15 to which are pivotally connected long links 16 which are pivotally connected with the levers 13 as shown.

When the device is in the position shown in Fig. 1 the short links 15 extend downwardly and rest upon the base 1, thus maintaining the levers 5 in the proper position so that the recessed portions 6 may be engaged by the front axle 7 of an automobile. The levers 13 and shoes 14 will then be disposed in the position indicated. When an automobile is driven on to the device it will pass over the rear elevating members 10 and its front axle 7 will engage the recessed portions 6, and will force the levers 5 into the position shown in Fig. 2. This is easily and quickly done without halt or jerk by a proper amount of power of the automobile exerted on the rear wheels at the proper time. It will be noted that by virtue of the angle between the links 15 and 16 the front axle 7 will be elevated to its highest position before the rear elevating members 10 will be operated. As the rear wheels have not been raised, the car will still travel forward and the links 15 and 16 having become straight will pull the levers 13 forward, thus elevating the shoes 14 which will then engage the rear axle 17 of the automobile, elevating it. The entire elevation is accomplished without shock or perceptible jar for as the front axle passes the center or its highest position and the automobile begins to descend the rear elevating levers 10 are gradually and without strain or jar brought into position beneath and against the rear axle, and during their entire upward movement until they become perpendicular and the elevation of the automobile is complete, they act as a brake or check to the descent of the forward end of the car on levers 5 whereby the entire movement or elevation of the automobile is effected without jar or strain.

In order to release the automobile from its elevated position I provide an upright lever 18 spaced from and to the rear of one of the rear elevating members 10 and connected with one of the levers 13 by means of a link 19. When the forward and rear members are in their elevated positions a rearward pull on the lever 18 will force one of the rear elevating members into its lowered position thus causing one of the levers 5 to be operated rearwardly to move the automobile rearwardly and out of engagement with the lifting members. It will be readily seen that although only one of the levers 5 is moved rearwardly by the direct action of the lever 18 the other lever 5 will be operated simultaneously by means of its connection with the first lever through the axle 7 of the automobile.

Many cars are provided with truss-rods at their rear portions, which truss-rods extend below the rear axle. In order to prevent injury to these truss-rods when the shoes 14 are elevated, I provide a shield 20 which surrounds the rear axle 17 of the car and the truss-rods and is engaged by the shoes 14 of the rear elevating members 10. This causes the weight of the car to be borne by these shields and the axle, instead of allowing the truss-rods themselves to be engaged by the shoes 14.

It will be understood that although I have shown and described my device in connection with an automobile, it is adapted for use with any other form of vehicle in which two axles are used. If it is desired to make the device adjustable I may interpose turnbuckles in the links 15, 16 and 19 for varying the lengths of the links, and I reserve the right to employ a different form of spring between the levers 5 and the bumpers 8 for absorbing the shock.

Having thus described my invention what I claim is:

1. A jack comprising a pair of inclined levers pivoted upon a base and adapted to be engaged by one axle of a vehicle, stops mounted on said base and adapted to be resiliently engaged by said levers, other levers spaced from and in alinement with said first named levers, short links connected with said first named levers, long links connected with said short links and with said last named levers, the points of connection of said sets of links being adapted to rest upon the base for supporting said first named levers at their proper inclination when in their initial position and to actuate said last named levers when said first named levers have been swung upward beyond the vertical, and a manually operated lever connected with said last named levers for returning them to their initial position after the jack has been actuated.

2. A jack comprising a pair of inclined levers pivoted upon a base and provided with recesses adapted to be engaged by one axle of a vehicle, stops adjacent said levers and adapted to be engaged thereby, springs secured on said levers and adapted to contact with said stops, two pairs of levers pivoted upon the base in alinement with and spaced from said first named levers, shoes pivotally connecting the upper ends of said pairs of levers and disposed parallel with the base, links connected with said first named levers, and links connected with said pairs of levers and with said first named links, said first named links being adapted to rest upon the base when the jack is in its initial position for maintaining said inclined levers at the proper inclination and bring said pairs of levers to a vertical position as said first named levers pass from a vertical position to a forwardly inclined position.

3. A jack comprising a pair of inclined levers pivoted upon a base and adapted to be engaged by one axle of a vehicle, stops adjacent said levers and adapted to be engaged thereby, springs secured on said levers and adapted to contact with said stops; two pairs of levers pivoted upon the base and spaced from said first named levers and in alinement therewith, shoes pivotally connecting the upper ends of each of said pairs of levers, and links connecting said first named levers with said pairs of levers and adapted to raise said pairs of levers to a vertical position when said first named levers are moved beyond a vertical position.

4. A jack comprising a pair of inclined levers pivoted upon a base and provided with recesses adapted to be engaged by one axle of a vehicle, stops adjacent said levers and adapted to be engaged thereby, two pairs of levers pivoted upon the base in alinement with and spaced from said first named levers, shoes pivotally connecting the upper ends of said pairs of levers, short links connected with said first named levers, long links connected with said pairs of levers and with said short links, an upright lever spaced from one of said pairs of levers, and a link connecting said upright lever with the adjacent pair of levers.

5. A jack comprising a base, two levers pivoted and separately mounted on said base, two pairs of levers pivotally mounted on said base, the levers of the respective pairs of levers connected by a shoe, said pairs of levers spaced apart and in alinement with said first named levers, means connecting said first named levers with said pairs of levers whereby said last named levers become actuated when said first named levers have been brought to a position beyond the vertical, and means for bringing said first named levers to a position beyond the vertical.

6. An automobile lifting jack comprising a base, two forward levers spaced apart and pivotally mounted on said base, two pairs of levers pivotally mounted on said base rearwardly of said first named levers and in alinement therewith, the levers of the respective pairs of levers connected by a shoe, and means for moving said pairs of levers in unison with said first named levers when said first named levers have passed forward of the center of their sweep.

7. An automobile lifting jack comprising a base, two forward levers spaced apart and pivotally mounted on said base, two pairs of levers pivotally mounted on said base rearwardly of said first named levers and in alinement therewith, the levers of the respective pairs of levers connected by a shoe at their upper ends, and means for moving said pairs of levers in unison with said first named levers when said first named levers have passed forward of the center of their sweep, and means for returning all of said levers to their initial positions.

8. In a lifting jack, two single levers and two pairs of levers, said single levers spaced apart opposite one another and said pairs of levers spaced apart opposite each other and in alinement with said first named levers, the levers of the respective pairs of levers connected by a shoe at their upper ends, and means for swinging said pairs of levers toward said first named levers and in unison therewith when said first named levers are swung beyond the apex of their sweep.

9. In a jack for automobiles, single levers and pairs of levers, the levers of the respective pairs of levers connected by a shoe; said single levers being adapted to be raised by the front axle of the automobile, and means for automatically raising said pairs of levers when said single levers pass forward of a vertical position.

10. In a jack for automobiles, single levers and pairs of levers, the levers of the respective pairs of levers connected by a shoe, said single levers being adapted to be raised by the front axle of the automobile, and means for automatically raising said pairs of levers and the rear wheels of said automobile.

11. In a jack for automobiles, single levers and pairs of levers, the levers of the respective pairs of levers pivotally connected by a shoe at their upper ends; said single levers being adapted to be raised by the front axle of the automobile and connected with said pairs of levers for automatically raising said pairs of levers to a vertical position and thereby raising the rear wheels of the automobile from the ground.

12. In a jack for automobiles, single levers adapted to be raised by the front axle of the automobile, and pairs of levers adapted to be raised to a vertical position by said first named levers when said first named levers pass beyond the vertical position; the levers of the respective pairs of levers being connected by a shoe.

13. In a jack for automobiles, single levers adapted to be raised by the front axle of the automobile, pairs of levers having their respective levers connected at their upper ends by a shoe, said pairs of levers connected with said first named levers and adapted to be raised to a vertical position by said first named levers when said first named levers pass beyond the vertical position, and means for limiting the downward movement of said first named levers.

14. In a jack for automobiles, single levers and pairs of levers, the levers of the respective pairs of levers pivotally connected by a shoe at their upper ends, said single levers being connected with said pairs of levers and adapted to be raised by the front axle of the automobile and carried forward of a vertical position by the momentum of the automobile and to automatically actuate the upward movement of said pairs of levers when said single levers have so passed the vertical position and bring said pairs of levers in contact with the rear axle of the automobile and raise them to a vertical position, and means for limiting the forward downward movement of said single levers.

In testimony whereof I hereto affix my signature in the presence of two witnesses.

WILLIAM G. PEUGH.

Witnesses:
 GEO. J. LEFTWICH,
 C. L. TUBB.

Copies of this patent may be obtained for five cents each, by addressing the "Commissioner of Patents, Washington, D. C."